United States Patent
Gwosdz

[11] Patent Number: 5,460,068
[45] Date of Patent: Oct. 24, 1995

[54] APPARATUS FOR CUTTING ICE CAKES INTO BLOCKS

[76] Inventor: Paul Gwosdz, 3615 Broad St., Houston, Tex. 77087

[21] Appl. No.: 250,423
[22] Filed: May 27, 1994
[51] Int. Cl.⁶ .................................................. B26D 1/50
[52] U.S. Cl. ..................... 83/168; 83/169; 83/401; 83/425.3; 83/808; 83/915.3
[58] Field of Search ................. 83/915.3, 425.3, 83/404.1, 437, 808, 168, 169, 401

[56] References Cited

U.S. PATENT DOCUMENTS

| | | | |
|---|---|---|---|
| 766,111 | 7/1904 | Mowery | 83/5 |
| 832,582 | 10/1906 | Sloan | 83/167 |
| 1,374,777 | 4/1921 | Stoner | 83/404.1 |
| 2,153,438 | 4/1939 | Shelton et al. | 143/38 |
| 2,156,247 | 4/1939 | Smith | 143/38 |
| 2,280,049 | 4/1942 | Turner et al. | 83/915.3 |
| 2,654,404 | 10/1953 | Neuhauser et al. | 83/404.1 |
| 3,570,563 | 3/1971 | Hall | 83/915.3 |
| 3,576,146 | 4/1971 | Adams | 83/409 |
| 5,189,939 | 3/1993 | Allen, Jr. | 83/915.3 |

Primary Examiner—Kenneth E. Peterson
Attorney, Agent, or Firm—Harrison & Egbert

[57] ABSTRACT

An improved apparatus for cutting conventional pound ice cakes into rectangular blocks suitably sized to be received by commercially available snow-cone shaving machines and the like. An ice cake is placed horizontally upon a tiltable table and then, using an automatic gravity feed, to expeditiously cut the cake into rectangular blocks of prescribed size, with minimal waste. An adjustable horizontal chain saw blade and an adjustable plurality of vertical chain saw blades simultaneously cut rectangular ice blocks.

10 Claims, 3 Drawing Sheets

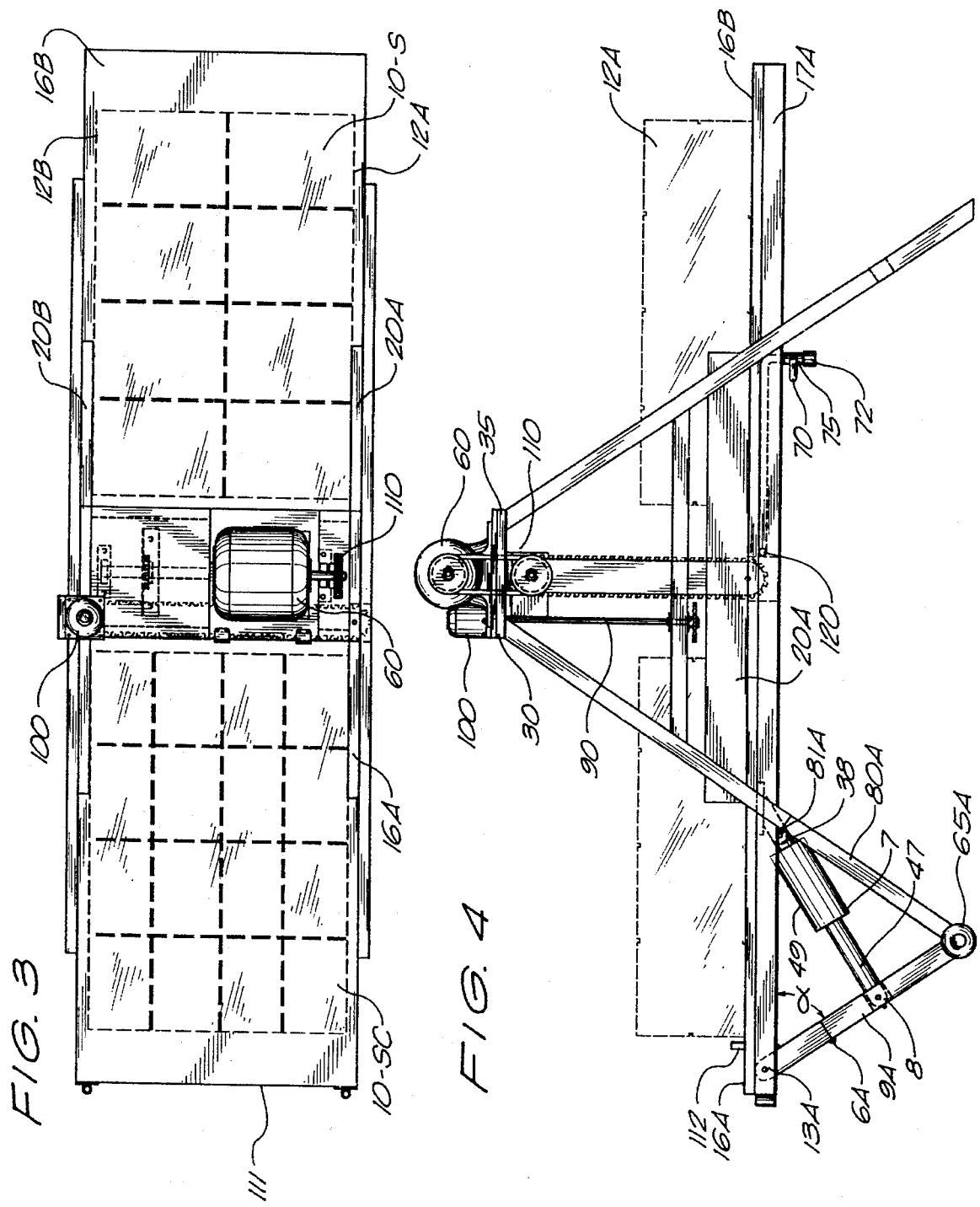

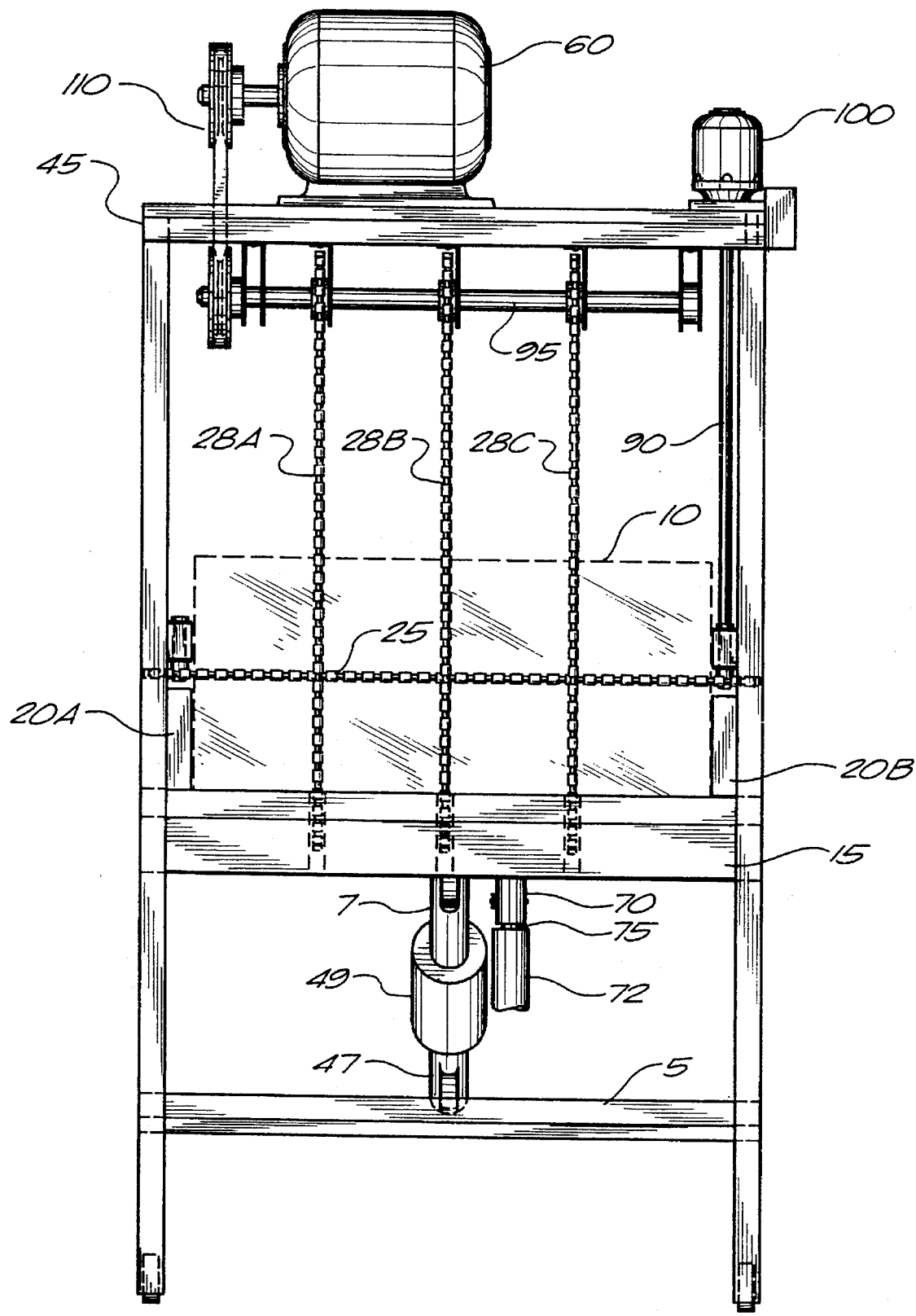

APPARATUS FOR CUTTING ICE CAKES INTO BLOCKS

BACKGROUND OF THE INVENTION

This invention relates to methods and apparatus for cutting ice, and more particularly relates to methods and apparatus for cutting a conventional ice cake and the like into rectangular blocks for use in snow-cone machines and the like.

It is well known in the prior art that conventionally sized block-ice or ice cakes approximately 300 pounds and nominally sized 11"×22"×42" must be cut into smaller typically rectangular blocks for use in commercially available apparatus. For instance, ice blocks approximately 10 pounds and dimensioned 5"×7"×11" are typically used in ice coolers and the like. As another example, ice block 14 pounds and dimensioned 5"×5"×14" are typically used in snow-cone shaving machines. Such snow-cones are, of course, accumulations of ice shavings configured with a conical cross-section and placed within a paper container of like conical cross-section. As is well known by the multitudes of consumers who have enjoyed a snow-cone on a hot day, a snow-cone, after being saturated with a flavored syrup, is hand-fed into the mouth.

During the summer months and particularly in geographical regions which are characterized by prolonged high temperatures, the demand is extraordinarily high for such 10 or 14 pound blocks. In the southwest region of the United States, for example, snow-cones are a popular source of cooling refreshment. But, unfortunately, the blocks required for such snow-cone machines are cut from larger ice cakes with considerable expenditure of man-time and commensurate ice waste.

As is known by those skilled in the art, to manually cut a 300 pound ice cake into blocks sized for a snow-cone machine and the like typically takes about 45 minutes to one hour. Probably more accurately described as a scoring-and-breaking process, inherent in this process, however, is considerable debris generation of and waste. Indeed, it is not uncommon for as much as 50 pounds from a 300 pound cake to be wasted. Hence, such 15% waste and labor-intensive cutting methodology has limited productivity for several years. There has been limited availability of an ice cake cutting apparatus and method to produce suitable blocks for ice coolers and snow-cone machines.

An alternative approach to making more suitably sized ice blocks available for ice coolers and the like, 10 pound blocks may be formed in freezers. But such freezing obviously is limited by the liquid-to-solid phase change process: approximately 150 blocks can be produced approximately every 26 hours in a conventional freezer. As is known in the art, however, larger ice cakes tend to engender better quality ice, having fewer bubbles and other defects dispersed throughout.

There are several ice cake cutting machines known in the art which attempt to deliver ice blocks to an anxious marketplace. For example, in U.S. Pat. No. 3,576,146, Adams teaches an apparatus for automatically cutting ice blocks from a conventional ice cake using a hoist to control the vertical position a supporting rig relative to a pair of spaced apart rotary saws which cut slots into a face of an ice cake, and relative to a chain saw which cuts perpendicularly through another face of the cake. These blades are configured to form three blocks of predetermined size. Penetration into a cake is accomplished by rotation of circular saw blades. Unfortunately, in addition to being complicated and expensive, the Adams apparatus suffers from the disadvantage that all of its working parts are located above the ice cake, thereby introducing contamination problems. The size of blocks produced by this apparatus are also constrained by the width thereof.

As another example, in U.S. Pat. No. 766,111, Mowery teaches an ice cutting machine which cuts an ice cake into cubes and the like using a combination of a vertically disposed gang of circular saws and a horizontally disposed band saw. The ice cake is horizontally placed upon a table and then manually engaged with these various saw blades and manually kept in contact therewith. The cut pieces pass through an oblique chute located below the table and fall into a receptacle. Thus, besides, there are significant safety concerns related to not only injury to the limbs, but also to injury caused by random discharge of ice chips and the like.

A recent contribution to the art is disclosed by Allen in U.S. Pat. No. 5,189,939. Allen teaches an apparatus for automatically cutting 240 pound cakes of dry ice by feeding it through an inclined chute using two pair of counter-rotating radial saw blades. The placement of spacers of varying length along the blades' axial shaft controls the size of the blocks produced. This design uses gravity-feed to effectuate engagement of a cake against the rotating blades and isolates the ice from the moving parts located outside the chute.

While, as hereinbefore exemplified, practitioners in the art have attempted to improve the means and method for generating ice blocks and cubes, there has been less effort expended to provide an inexpensive and simple machine for productively and safely cutting conventionally sized ice cakes into blocks of prescribed dimension. It would be particularly advantageous to have available to those skilled in the art an apparatus and method which could use a simple table surface to cut ice cakes while providing automatic gravity-feed thereof to avoid safety hazards associated with manual feed thereof. It would also benefit the prior art if such apparatus were designed with an effective means to completely cut an ice cake into prescribed size ice blocks in approximately 2 minutes but with minimal waste.

Accordingly, these limitations and disadvantages of the prior art are overcome with the present invention, and improved means and techniques are provided which are useful for cutting ice cakes into rectangular ice blocks for use in snow-cone shaving machines and the like.

SUMMARY OF THE INVENTION

The present invention provides an improved apparatus for cutting conventional 300 pound ice cakes into rectangular blocks suitably sized to be received by commercially available snow-cone shaving machines and the like. In accordance with the present invention, means not heretofore known in the art are used to place such an ice cake horizontally upon a tiltable table and then, using an automatic gravity feed, to expeditiously cut the cake into rectangular blocks of prescribed size, with minimal waste.

In accordance with the preferred embodiment of the present invention, an adjustable horizontal chain saw blade, facing an approaching ice cake, and an adjustable plurality of vertical chain saw blades, disposed above the ice cake, simultaneously cut rectangular ice blocks configured for snow cone machines and the like. As will be described in detail, it is an inherent advantage of the present invention that high quality ice blocks are reliably produced in a safe and cost-effective and productive manner.

Accordingly, in accordance with the present invention, means are provided to enable 300 pound ice cakes to be cut into 10 pound blocks at a rate of approximately 300–350 blocks per hour. As should be appreciated by those skilled in the art, such production rates have been heretofore unknown. Indeed, production of such ice blocks has been characterized by poor productivity and considerable waste.

It is an object of the present invention to provide a simple and semi-automatic method for cutting ice blocks from conventional 500 pound ice cakes.

It is also an object of the present invention to provide a method and apparatus for cutting ice blocks for use in snow-cone machines and ice coolers, with less ice waste than has been hereinbefore known in the art.

It is a further object of the present invention to provide an apparatus and method for cutting ice blocks for use in snow-cone machines and ice coolers, with minimal consumption of both time and labor than has been hereinbefore known in the art.

It is a feature and advantage of the present invention that minimal energy is consumed driving a conventional ice cake against a plurality of cutting blades, with energy being consumed primarily to power the blades' cutting action.

It is a further object of the present invention to provide an inexpensive ice cake cutting apparatus which is constructed with minimal moving parts.

It is a specific object of the present invention to provide an apparatus for cutting a plurality of rectangular blocks from a rectangular ice cake, said rectangular blocks configured to be received by a snow-cone shaving machine, said apparatus comprising: table means having a plurality of adjustable spaced-apart chain saw blades disposed normally of a surface of said table means and adapted for horizontally receiving said ice cake; means for tilting said table means for linearly advancing said ice cake longitudinally and horizontally along said surface of said table means to engage said ice cake against said plurality of chain saw blades; guide means for controlling said linear advancement of said ice cake parallel to opposite longitudinal edges of said surface of said table means such that each lateral surface of said ice cake is perpendicular to said surface and corresponding leading edge of said ice cake is maintained perpendicular to said plurality of chain saw blades; retaining means for terminating said advancement of said ice cake subsequent to being cut into said plurality of rectangular blocks; and spray means for preventing accumulation of ice debris on surfaces of said plurality of chain saw blades.

It is another specific object of the present invention to provide an apparatus for cutting a plurality of rectangular blocks from a rectangular ice cake, said rectangular blocks configured to be received by a snow-cone shaving machine, said apparatus comprising: elongated table means having a top surface with a receiving portion at one end and a discharging portion at the other opposite end, and having guide means configured for aligning said rectangular ice cake in a parallel relationship with said table means' longitudinal axis; mounting plate means fixedly attached to said disposed transversely of and above said top surface of said table means; a pair of pivotable legs attached at one end to said table means and attached at its other opposite end to an axle means; a pair of wheels rotatably attached at each opposite end of said axle means; said pair of pivotable legs having an interconnecting support member disposed perpendicularly thereof and disposed medially of said table means and said axle means; a first pair of transversal legs fixedly attached at one end to said mounting plate and pivotally attached to said axle means; a second pair of transversal legs fixedly attached at one end to said mounting plate and fixedly attached medially to said table means, with its other opposite end configured to stabilize said table means by resting upon a floor; a plurality of adjustable spaced-apart chain saw blades rotatably attached to said mounting plate means and disposed perpendicularly of a said top surface of said table means, configured to cut vertically into said ice cake; an adjustable horizontal chain saw blade means rotatably attached to said table means and disposed parallel to said top surface thereof, configured to cut horizontally into said ice cake simultaneously with said plurality of chain saw blades cutting vertically thereinto; tilting means pivotally attached at one end to said support member and pivotally attached at its other opposite end to said table means, for drawing said pair of pivotable legs under said discharging portion of said table means and for, in turn, linearly advancing said ice cake longitudinally along said top surface of said table means from said receiving portion to said discharging portion thereof, to continuously engage said ice cake against said plurality of chain saw blades; guide means for controlling said linear advancement of said ice cake parallel to opposite longitudinal edges of said top surface of said table means such that each lateral surface of said ice cake is perpendicular to said top surface and corresponding leading edge of said ice cake is maintained perpendicular to said plurality of chain saw blades; retaining means for terminating said advancement of said ice cake subsequent to being cut into said plurality of rectangular blocks; spray means disposed beneath said table means, for preventing accumulation of ice debris on surfaces of said plurality of chain saw blades; and power means disposed upon said mounting plate, for driving said plurality of vertical saw blade means and for driving said horizontal saw blade means.

These and other objects and features of the present invention will become apparent from the following detailed description, wherein reference is made to the figures in the accompanying drawings.

IN THE DRAWINGS

FIG. 3 depicts a top view of the apparatus depicted in FIG. 1.

FIG. 4 depicts a side view of the apparatus depicted in FIG. 1.

FIG. 5 depicts a partial cut-away end view of the apparatus depicted in FIG. 1.

DETAILED DESCRIPTION

Figure 1:
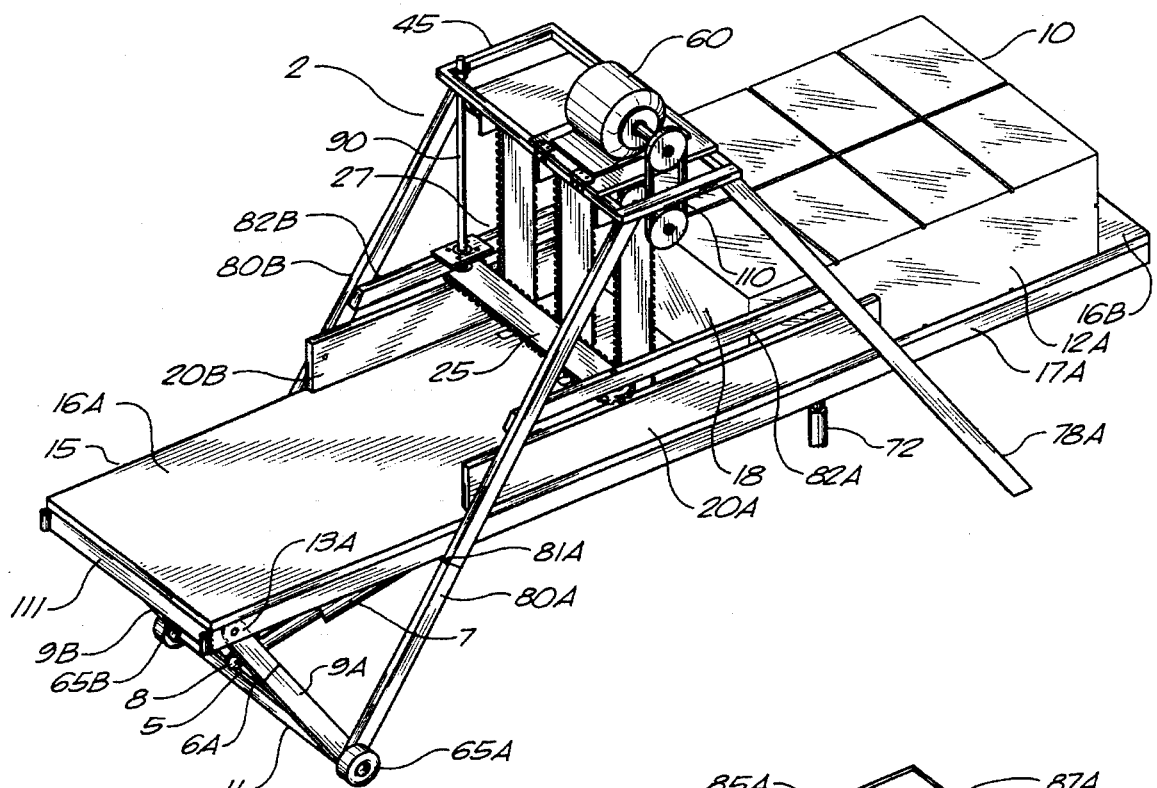
FIG. 1 depicts a frontal perspective view of an apparatus embodying the present invention.

FIG. 1 depicts a frontal perspective view of a preferred embodiment of ice cake cutter apparatus 2 constructed in accordance with the present invention. More particularly, there is shown table 15 supported by transversal legs 78A–B and 80A–B, respectively, and pivotable legs 9A–B, and with plurality of vertically disposed chain saw blades 27 and horizontally disposed chain saw blade 25. Mounting plate 45 is fixedly attached to the top portions of each of transversal legs 78A–B and 80A–B. Motor 60 is supported atop plate 45, and is interconnected with pulley 110 in a manner well known in the art.

Still referring to FIG. 1, there is shown transversal leg 80A fixedly attached to guide plate 20A which is fixedly attached to table 15 just above longitudinal table edge 17A and contacting floor with wheel 65A. Similarly, transversal leg 80B is fixedly attached to guide plate 20B which is fixedly attached to table 15 just above longitudinal table edge 17B and contacts floor with wheel 65B. Transversal leg 80A is pivotably adjoined with leg 9A preferably on one end of axle 11, to which wheel 65A is attached. Similarly, transversal leg 80B is pivotably adjoined with leg 9B preferably on the opposite end of axle 11, to which corresponding wheel 65B is attached. Legs 9A–B are pivotally attached to table 15 respectively at pivot 13A and a similar pivot not shown, and are, in turn, fixedly attached to opposite ends of supporting cross-member 5, which is pivotally attached to arm 7 with hinge 8. Arm 7 is also pivotally attached at its opposite other end to table 15 with hinge 38.

Plurality of chain saw blades 27 is preferably constructed with each chain saw blade disposed in a vertical plane having each of its longitudinal edges aligned with the longitudinal axis of table 15. These vertical planes are parallel to each other so that a series of vertical cuts may be made in ice cake 10 as will hereinafter be described in detail. Plurality of chain saw blades 27 is maintained in alignment by saw blade guide 25 which is preferably disposed substantially in a horizontal plane. Saw blade guide 25 is preferably adjacent plurality of vertical chain saw blades 27 and is fixedly attached to support members 82A–B. As should be evident to those skilled in the art, support members 82A–B provide brace means to legs 80A–B and 78A–B, affording stability to an apparatus constructed according to the teachings of the present invention.

Referring now to FIGS. 1, 3 and 4, there is depicted guide plates 20A–B for aligning longitudinal edges 12A–B of ice cake 10 so that the ice cake travels in a direction parallel to the edges of plurality of chain saw blades 27 along table 15. The travel of ice cake 10 is controlled by angle α° representing the incline of table 15 relative to pivotable table legs 9A–B as will be hereinafter described.

Figure 2:
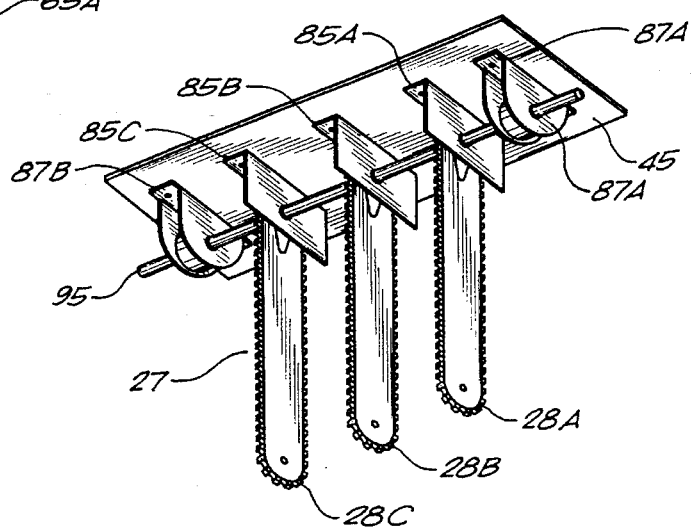
FIG. 2 depicts an enlarged frontal perspective view of a portion of the apparatus depicted in FIG. 1.

Now specifically referring to FIG. 2, there is depicted an enlarged isolated perspective view of plurality of saw blades 27 with individual saw blades 28A–C attached to mounting plate 45, observed from below said mounting plate. Plurality of chain saw blades 27 is supported by corresponding mounting brackets 85A–B–C which are fixedly attached to shaft 95 and to underside of plate 45. Also shown is pair of pillow block beatings 40A–B fixedly attached to brackets 87A–B and mounted on opposite end portions of shaft 95, for retaining the shaft's position thereat.

In accordance with the present invention and referring to FIGS. 1–5, to produce blocks properly sized to be received by a commercially available snow-cone machine and the like, conventional ice cake 10 is placed upon table 15 along its longitudinal axis, with the longitudinal sides 12 A–B of ice cake 10 abutting preferably rectangular guide plates 20A–B, respectively. As should be apparent to those skilled in the art, guide plates 20A–B are configured to align sides 12A–B of ice cake 10 in a parallel relationship with table edges 17A–B and leading edge 18 of ice cake 10 perpendicular to plurality of saw blades 27. Once ice cake 10 is properly positioned upon table 15, plurality of saw blades 27 is activated by switch 30, thereby causing saw blades 28A–C to engage ice cake 10 with a conventional vertical cutting motion well known in the art. Simultaneously, horizontal saw blade 25 is caused to engage ice cake 10 with a conventional horizontal cutting motion. Contemporaneously, table tilt switch 35 is activated, thereby causing hydraulic arm 7 to recede. As arm 7 recedes, cross-member 5 pulls legs 9A–B in a direction under table 15, whereupon wheels 65A–B are caused to rotate and enable the downward tilting movement of table-top portion 16A. Since table-top portion 16A is positioned below table top portion 16B, ice cake 10 is caused to linearly and preferably continuously move toward plurality of chain saw blades 27. Thus, this table tilting action results in a controlled gravity-feed of ice cake 10 against saw blades 28A–C and 25.

As should be evident to those skilled in the art, the movement of an ice cake from the receiving portion to the discharging portion of an apparatus constructed according to the present invention may be stopped either by the presence of detents and the like affixed upon the top table surface or by rapidly untilting the table wherein there is no longer any angle of tilt, or both. For example, the present invention as depicted in FIGS. 1, 3 and 4 could be constructed with detents 112 disposed transversely across discharging portion 16A, affixed preferably proximal to table edge 111. It may be advantageous, however, in order to promote the bagging of cut ice blocks, not to have physical detents inhibiting the discharging of these ice blocks from edge 111.

In accordance with the present invention, a table-tilt of 20°–35° has been found to be sufficient to feed a conventional 300–400 pound ice cake against a plurality of saw blades configured as described herein, and a table-tilt of 25°–30° has been found to be particularly advantageous. Thus, a speed of movement of ice cake 10 of preferably about 1 inch/second may be achieved for a table tilt of about 25°, and such 300–400 pound ice cake (measuring about 42–50 inches long) may be cut into substantially rectangular blocks for use in a snow cone machine nominally in only one minute. Of course, the hereinbefore described cutting of ice cakes into ice blocks may be achieved by virtually any other rate of tilt consistent with the purposes of the present invention, provided such cutting is performed in a safe, controlled manner.

Now specifically referring to FIGS. 1 and 4, there is shown hydraulic arm 7 pivotally attached at one end to cross-member 5 by hinge 8 and pivotally attached at the opposite end to table 15 by hinge 38. As should be apparent to those skilled in the art, as piston 47 is drawn into corresponding cylinder 49, tilting leg 9A is caused to pivot about pivot 6A and tilting leg 9B pivots in a similar fashion. Transversal leg 80A is caused to pivot about pivot 81A and transversal leg 81B pivots in a similar fashion, such that axle 11 moves to the left, as viewed in FIG. 1, thereby lowering table 15 at that end. Once ice cake 10 is completely cut into a plurality of ice blocks, as depicted in FIG. 3, table top portion 16A is returned to a level position, with a tilt of substantially α=0°.

Referring to FIG. 1, there is depicted an embodiment of the present invention wherein horizontal saw blade 25 is driven by motor 60. By a suitable arrangement of gears, power is communicated through shaft 90, thereby causing cutting action of saw blade 25 against advancing ice cake 10, as has been hereinbefore described. An alternative embodiment of the present invention is depicted in FIGS. 3–5 wherein horizontal saw blade 25 is driven by motor 100, separate from motor 60, which exclusively drives plurality of vertical saw blades 27.

Now referring to FIGS. 1, 4 and 5 there is depicted water hose 72 connected to fitting 75 containing water pressure control means 70. According to the teachings of the present invention, it is advantageous to provide water jet spray 120, emanating from water flowing through hose 72, aimed at the cutting blades as hereinbefore described, for keeping these blades clean and for avoiding an accumulation of ice thereon.

As shown in FIGS. 1 and 3, an ice cake fed into an apparatus constructed in accordance with the present invention may be pre-scored in a rectangular pattern to facilitate ultimate separation thereof into ice cakes, after the cutting taught herein is completed. As is well known to those skilled in the art, such pre-scoring is typically about one inch deep. Referring specifically to FIG. 3, there is shown pre-scored ice cake 10-S which is fed into the present invention and, after being subjected to the cutting action thereof, is rendered into a corresponding ice cake 10-SC with the cut pattern shown. Of course, it is within the teachings of the present invention that the positioning of both of horizontal saw blade 25 and plurality of chain saw blades 27, relative to ice cake 10, may be readily adjusted if necessary to accommodate either varying ice cake size or modification in ice block size prerequisite for the operation of snow cone machines and the like.

As should be apparent to those skilled in the art, the hereinbefore described apparatus and method taught by the present invention provides high quality ice blocks for snow-cone shaving machines and the like at a rate hereinbefore unknown in the art. Particularly in hot climates, the demand for ice blocks sized to be accommodated by specialty machines like such a snow-cone shaving machine is apt to remain unfulfilled without the benefits provided by the present invention.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An apparatus for cutting a plurality of rectangular blocks from a rectangular ice cake, said rectangular blocks configured to be received by a snow-cone shaving machine, said apparatus comprising:

elongated table means having a top surface with a receiving portion at one end and a discharging portion at the other opposite end, and having guide means configured for aligning said rectangular ice cake in a parallel relationship with said table means' longitudinal axis;

mounting plate means disposed transversely of and above said top surface of said table means;

a pair of pivotable legs attached at one end to said table means and attached at its other opposite end to an axle means;

a pair of wheels rotatably attached at each opposite end of said axle means;

said pair of pivotable legs having an interconnecting support member disposed perpendicularly thereof and disposed medially of said table means and said axle means;

a first pair of transversal legs fixedly attached at one end to said mounting plate and pivotally attached to said axle means;

a second pair of transversal legs fixedly attached at one end to said mounting plate and fixedly attached medially to said table means, with its other opposite end configured to stabilize said table means by resting upon a floor;

a plurality of adjustable spaced-apart chain saw blades rotatably attached to said mounting plate means and disposed perpendicularly of a said top surface of said table means, configured to cut vertically into said ice cake;

an adjustable horizontal chain saw blade means rotatably attached to said table means and disposed parallel to said top surface thereof, configured to cut horizontally into said ice cake simultaneously with said plurality of chain saw blades cutting vertically thereinto;

tilting means pivotally attached at one end to said support member and pivotally attached at its other opposite end to said table means, for drawing said pair of pivotable legs under said discharging portion of said table means and for, in turn, linearly advancing said ice cake longitudinally along said top surface of said table means from said receiving portion to said discharging portion thereof, to continuously engage said ice cake against said plurality of chain saw blades;

guide means for controlling said linear advancement of said ice cake parallel to opposite longitudinal edges of said top surface of said table means such that each lateral surface of said ice cake is perpendicular to said top surface and corresponding leading edge of said ice cake is maintained perpendicular to said plurality of chain saw blades; and power means disposed upon said mounting plate, for driving said plurality of vertical saw blade means and for driving said horizontal saw blade means.

2. The apparatus recited in claim 1, wherein said mounting plate means is further disposed at transverse joinder of said receiving portion and said discharging portion of said table top surface.

3. The apparatus recited in claim 1, wherein said table means further comprises spray means disposed therebeneath, for preventing accumulation of ice debris on surfaces of said plurality of chain saw blades.

4. The apparatus recited in claim 1, wherein said power means comprises a motor means for driving both of said plurality of vertical saw blade means and said horizontal saw blade means.

5. The apparatus recited in claim 1, wherein said tilting means comprises a hydraulically operated piston and corresponding cylinder means.

6. The apparatus recited in claim 1, wherein said table means further comprises retaining means for terminating said advancement of said ice cake subsequent to being cut into said plurality of rectangular blocks.

7. An apparatus for cutting a plurality of rectangular blocks from a rectangular ice cake, said rectangular blocks configured to be received by a snow-cone shaving machine, said apparatus comprising:

elongated table means having a top surface with a receiving portion at one end and a discharging portion at the other opposite end, and having guide means configured for aligning said rectangular ice cake in a parallel relationship with said table means' longitudinal axis;

mounting plate means disposed transversely of and above said top surface of said table means;

a pair of pivotable legs attached at one end to said table means and attached at its other opposite end to an axle means;

a pair of wheels rotatably attached at each opposite end of said axle means;

said pair of pivotable legs having an interconnecting support member disposed perpendicularly thereof and disposed medially of said table means and said axle means;

a first pair of transversal legs fixedly attached at one end to said mounting plate and pivotally attached to said axle means;

a second pair of transversal legs fixedly attached at one end to said mounting plate and fixedly attached medially to said table means, with its other opposite end configured to stabilize said table means by resting upon a floor;

a plurality of adjustable spaced-apart chain saw blades rotatably attached to said mounting plate means and disposed perpendicularly of a said top surface of said table means, configured to cut vertically into said ice cake;

an adjustable horizontal chain saw blade means rotatably attached to said table means and disposed parallel to said top surface thereof, configured to cut horizontally into said ice cake simultaneously with said plurality of chain saw blades cutting vertically thereinto;

tilting means pivotally attached at one end to said support member and pivotally attached at its other opposite end to said table means, for drawing said pair of pivotable legs under said discharging portion of said table means and for, in turn, linearly advancing said ice cake longitudinally along said top surface of said table means from said receiving portion to said discharging portion thereof, to continuously engage said ice cake against said plurality of chain saw blades;

guide means for controlling said linear advancement of said ice cake parallel to opposite longitudinal edges of said top surface of said table means such that each lateral surface of said ice cake is perpendicular to said top surface and corresponding leading edge of said ice cake is maintained perpendicular to said plurality of chain saw blades;

retaining means for terminating said advancement of said ice cake subsequent to being cut into said plurality of rectangular blocks;

spray means disposed beneath said table means, for preventing accumulation of ice debris on surfaces of said plurality of chain saw blades; and power means disposed upon said mounting plate, for driving said plurality of vertical saw blade means and for driving said horizontal saw blade means.

8. The apparatus recited in claim 7, wherein said mounting plate means is further disposed at transverse joinder of said receiving portion and said discharging portion of said table top surface.

9. The apparatus recited in claim 7, wherein said power means comprises a motor means for driving both of said plurality of vertical saw blade means and said horizontal saw blade means.

10. The apparatus recited in claim 7, wherein said tilting means comprises a hydraulically operated piston and corresponding cylinder means.

* * * * *